(12) United States Patent
Tsugawa et al.

(10) Patent No.: US 11,713,120 B2
(45) Date of Patent: Aug. 1, 2023

(54) TAKEOFF AND LANDING DEVICE, TAKEOFF AND LANDING SYSTEM, AND UNMANNED DELIVERY SYSTEM

(71) Applicant: Ishida Co., Ltd., Kyoto (JP)

(72) Inventors: Tono Tsugawa, Kyoto (JP); Kaname Kitagawa, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 787 days.

(21) Appl. No.: 16/489,120

(22) PCT Filed: Feb. 8, 2018

(86) PCT No.: PCT/JP2018/004444
§ 371 (c)(1),
(2) Date: Nov. 15, 2019

(87) PCT Pub. No.: WO2018/159256
PCT Pub. Date: Sep. 7, 2018

(65) Prior Publication Data
US 2020/0062395 A1 Feb. 27, 2020

(30) Foreign Application Priority Data
Mar. 1, 2017 (JP) ................................ 2017-038710

(51) Int. Cl.
*B64C 39/02* (2023.01)
*B64D 1/22* (2006.01)
(Continued)

(52) U.S. Cl.
CPC ............. *B64C 39/024* (2013.01); *B64D 1/22* (2013.01); *B64D 45/00* (2013.01); *B64F 1/32* (2013.01);
(Continued)

(58) Field of Classification Search
CPC ............ B64C 39/024; B64C 2201/027; B64C 2201/128; B64C 2201/141; B64D 1/22;
(Continued)

(56) References Cited

U.S. PATENT DOCUMENTS 8,511,606 B1  8/2013 Lutke et al.
9,387,928 B1  7/2016 Gentry et al.
(Continued)

FOREIGN PATENT DOCUMENTS

CN  105539843 A  5/2016
CN  205801968 U  12/2016
(Continued)

OTHER PUBLICATIONS

International Search Report issued in PCT/JP2018/004444; dated May 1, 2018.
(Continued)

*Primary Examiner* — Fadey S. Jabr
*Assistant Examiner* — Naeem Taslim Alam
(74) *Attorney, Agent, or Firm* — Studebaker & Brackett PC

(57) ABSTRACT

A takeoff and landing device, includes: a fixing devices or a communication unit configured to be able to switch between a first state that is a state of preventing the unmanned aerial vehicle from taking off from the takeoff and landing device and a second state that is a state of not preventing taking off; a weight acquisition unit configured to acquire weight of the article that the unmanned aerial vehicle delivers; and a takeoff controller or a takeoff controller configured to switch a state of the fixing devices or the communication unit to the first state or the second state on the basis of the weight of the article acquired by the weight acquisition unit and of a reference value for determining whether it is an overload.

15 Claims, 10 Drawing Sheets

(51) Int. Cl.
    *B64D 45/00*     (2006.01)
    *G05D 1/10*     (2006.01)
    *B65G 1/137*     (2006.01)
    *B64F 1/32*     (2006.01)
    *B64U 10/13*     (2023.01)
    *B64U 101/60*     (2023.01)

(52) U.S. Cl.
    CPC ............ *B65G 1/137* (2013.01); *G05D 1/101* (2013.01); *B64U 10/13* (2023.01); *B64U 2101/60* (2023.01); *B64U 2201/10* (2023.01)

(58) Field of Classification Search
    CPC ........... B64D 45/00; B64F 1/32; B65G 1/137; G05D 1/101
    See application file for complete search history.

(56) References Cited

U.S. PATENT DOCUMENTS

| | | | | |
|---|---|---|---|---|
| 9,412,278 | B1* | 8/2016 | Gong | G06F 21/44 |
| 10,000,284 | B1* | 6/2018 | Purwin | B64B 1/26 |
| 10,099,561 | B1* | 10/2018 | Ananthanarayanan | B60L 53/32 |
| 10,351,239 | B2* | 7/2019 | Di Benedetto | G08G 5/0082 |
| 10,663,529 | B1* | 5/2020 | Bolotski | G01R 31/3648 |
| 10,717,524 | B1* | 7/2020 | Boyes | B64D 43/00 |
| 2009/0129902 | A1* | 5/2009 | Schafer | B65G 1/1378 414/274 |
| 2013/0085629 | A1* | 4/2013 | Washington | G05D 1/0055 701/15 |
| 2015/0035437 | A1* | 2/2015 | Panopoulos | B60L 53/12 315/291 |
| 2016/0209839 | A1 | 7/2016 | Hoareau et al. | |
| 2016/0239803 | A1* | 8/2016 | Borley | G06Q 10/08355 |
| 2016/0244187 | A1* | 8/2016 | Byers | B64D 1/00 |
| 2017/0061802 | A1* | 3/2017 | Barraci | G08G 5/006 |
| 2017/0076610 | A1* | 3/2017 | Liu | G08G 5/0069 |
| 2017/0132566 | A1* | 5/2017 | High | B64C 39/024 |
| 2017/0270803 | A1* | 9/2017 | High | G08G 5/006 |
| 2017/0275024 | A1* | 9/2017 | Bennett | B64F 1/12 |
| 2017/0293991 | A1* | 10/2017 | High | B64C 39/024 |
| 2017/0323257 | A1* | 11/2017 | Cheatham, III | G06Q 10/0832 |
| 2018/0009549 | A1* | 1/2018 | Sullivan | B64C 39/022 |
| 2018/0068567 | A1* | 3/2018 | Gong | G08G 5/0039 |
| 2018/0099765 | A1* | 4/2018 | Lee | B64G 1/428 |
| 2018/0188102 | A1* | 7/2018 | Nance | G01G 19/07 |
| 2018/0244386 | A1* | 8/2018 | Phan | G08G 5/0069 |
| 2018/0308367 | A1* | 10/2018 | Zhang | G08G 5/0086 |
| 2019/0114925 | A1* | 4/2019 | Schulman | G08G 5/0082 |
| 2019/0174149 | A1* | 6/2019 | Zhang | H04N 21/2187 |
| 2019/0220819 | A1* | 7/2019 | Banvait | G06Q 10/0832 |
| 2019/0278897 | A1* | 9/2019 | Zhang | G06F 21/604 |
| 2020/0017210 | A1* | 1/2020 | Neubecker | E05F 15/70 |

FOREIGN PATENT DOCUMENTS

| | | |
|---|---|---|
| CN | 205862591 U | 1/2017 |
| GB | 665902 A | 1/1952 |
| JP | 2001-114407 A | 4/2001 |
| JP | 2016-135625 A | 7/2016 |
| JP | 2016-151989 A | 8/2016 |
| JP | 2016-153337 A | 8/2016 |

OTHER PUBLICATIONS

International Preliminary Report on Patentability and Written Opinion issued in PCT/JP2018/004444; dated Sep. 3, 2019.

* cited by examiner

TAKEOFF AND LANDING DEVICE, TAKEOFF AND LANDING SYSTEM, AND UNMANNED DELIVERY SYSTEM

TECHNICAL FIELD

One aspect of the present invention relates to a takeoff and landing device, a takeoff and landing system, and an unmanned delivery system.

BACKGROUND ART

An unmanned aerial vehicle (what is called a drone) that is maneuvered by remote operation or autonomously flying by a program has been known. In recent years, it has been offered to utilize such an unmanned aerial vehicle in various fields. For example, in Patent Literature 1 and 2, systems that deliver an article by utilizing an unmanned aerial vehicle have been disclosed.

CITATION LIST

Patent Literature

Patent Literature 1: Japanese Unexamined Patent Publication No. 2016-151989
Patent Literature 2: Japanese Unexamined Patent Publication No. 2016-153337

SUMMARY OF INVENTION

Technical Problem

The unmanned aerial vehicle is susceptible to disturbances such as wind if the weight of an article to deliver (load weight) becomes large with respect to the weight of the unmanned aerial vehicle. When the unmanned aerial vehicle is subjected to such disturbances, the intended control may no longer be possible, and that may hinder a safe flight. For this reason, when delivering an article by utilizing an unmanned aerial vehicle, there is a need not only to legislate for prohibiting the flight in a state where the load weight is greater than or equal to a predetermined value (hereinafter referred to as "overload") but also to form a scheme that makes the relevant law observed.

Thus, an object of one aspect of the present invention is to provide a takeoff and landing device, a takeoff and landing system, and an unmanned delivery system capable of preventing an unmanned aerial vehicle from flying in an overloaded state.

Solution to Problem

A takeoff and landing device for an unmanned aerial vehicle according to one aspect of the present invention is a takeoff and landing device for an unmanned aerial vehicle configured to deliver an article, the takeoff and landing device allowing the unmanned aerial vehicle to perform taking off and landing, and includes a takeoff prevention unit configured to be able to switch between a first state that is a state of preventing the unmanned aerial vehicle from taking off from the takeoff and landing device and a second state that is a state of not preventing takeoff, a weight acquisition unit configured to acquire weight of the article that the unmanned aerial vehicle delivers, and a first controller configured to switch a state of the takeoff prevention unit to the first state or the second state on the basis of the weight of the article acquired by the weight acquisition unit and of a reference value for determining whether it is an overload.

In this takeoff and landing device for an unmanned aerial vehicle, the controller acquires the weight of the article to be loaded on the unmanned aerial vehicle that attempts to take off from the takeoff and landing device and, upon determining that it becomes an overloaded state from the relevant weight, controls the takeoff prevention unit so as to be in the first state, thereby preventing the unmanned aerial vehicle from taking off. As a result, because the unmanned aerial vehicle in the overloaded state is unable to take off from the takeoff and landing device, the unmanned aerial vehicle can be prevented from flying in the overloaded state.

In the takeoff and landing device for an unmanned aerial vehicle according to one aspect of the present invention, the takeoff prevention unit may be a fixing device configured to fix the unmanned aerial vehicle to the takeoff and landing device, and the fixing device may be able to switch between the first state in which the unmanned aerial vehicle is fixed to the takeoff and landing device and the second state in which the fixing of the unmanned aerial vehicle to the takeoff and landing device is released.

In this takeoff and landing device for an unmanned aerial vehicle, the fixing device that prevents, by fixing the unmanned aerial vehicle to the takeoff and landing device, the unmanned aerial vehicle from taking off is employed as the takeoff prevention unit. That is, in this takeoff and landing device, even if the unmanned aerial vehicle attempts to take off, the unmanned aerial vehicle is physically fixed to the takeoff and landing device, and thus is unable to take off. As a result, with a simple structure, the takeoff of the unmanned aerial vehicle in an overloaded state can be prevented.

In the takeoff and landing device for an unmanned aerial vehicle according to one aspect of the present invention, the takeoff prevention unit may be a transmitting unit configured to transmit a control signal that causes the unmanned aerial vehicle to perform a flight operation, and the transmitting unit may be able to switch between the first state in which transmission of the control signal is prohibited and the second state in which the transmission of the control signal is permitted.

In this takeoff and landing device for an unmanned aerial vehicle, the transmitting unit that prevents, by not transmitting the control signal that causes the unmanned aerial vehicle to perform a flight operation, the unmanned aerial vehicle from taking off is employed as the takeoff prevention unit. That is, in this takeoff and landing device, because the control signal that causes the unmanned aerial vehicle to attempt taking off is not transmitted, the unmanned aerial vehicle never takes off. As a result, with a simple configuration, the takeoff of the unmanned aerial vehicle in an overloaded state can be prevented.

The takeoff and landing device for an unmanned aerial vehicle according to one aspect of the present invention may further include a first weight detector configured to measure a weight of an article to deliver, and the weight acquisition unit may acquire the weight of the article from the first weight detector.

In this takeoff and landing device for an unmanned aerial vehicle, the weight of the unmanned aerial vehicle in a state in which the article is loaded is measured and subtracts the weight of the unmanned aerial vehicle stored in advance, thereby calculating the weight of the article. Because the weight of the article is measured by the first weight detector such as a load cell, as compared with the case where the weight of the article is estimated, an overloaded state can be determined more accurately. Furthermore, as compared with a weight detector (second weight detector) that is installed on the unmanned aerial vehicle, a weight detector having a wider weight measurement range can be employed. That is, even a heavier weight can be measured.

The takeoff and landing device for an unmanned aerial vehicle according to one aspect of the present invention may further include a remaining-amount acquisition unit configured to acquire a remaining amount of an energy source for a power source installed on the unmanned aerial vehicle, a flying-information storage unit configured to store therein flying information that is a relation among the weight of an article to be loaded on the unmanned aerial vehicle, the remaining amount, and a flying distance or flying time of the unmanned aerial vehicle, and a delivery-destination information acquisition unit configured to acquire a delivery distance or delivery time from the current location to a delivery destination of the article, and the first controller may determine whether the unmanned aerial vehicle is able to navigate to the delivery destination on the basis of the weight of the article acquired by the weight acquisition unit, the remaining amount acquired from the remaining-amount acquisition unit, the delivery distance or the delivery time acquired from the delivery-destination information acquisition unit, and the flying information, and may switch the state of the takeoff prevention unit to the first state upon determining that it is impossible to navigate, and switch the state of the takeoff prevention unit to the second state upon determining that it is possible to navigate.

In this takeoff and landing device for an unmanned aerial vehicle, the determination is made by not only considering an overload but also considering whether the unmanned aerial vehicle is able to navigate to the delivery destination, and based on the relevant determination, the unmanned aerial vehicle is permitted to take off. This makes it possible to make the unmanned aerial vehicle navigate more safely.

A takeoff and landing system for an unmanned aerial vehicle according to one aspect of the present invention includes an unmanned aerial vehicle including a second weight detector configured to measure a weight of an article to deliver, and being configured to deliver the article by flying based on a control signal that controls flight of the unmanned aerial vehicle device, and the above-described takeoff and landing device, and the weight acquisition unit may acquire the weight of the article from the second weight detector.

In this takeoff and landing system for an unmanned aerial vehicle, because the weight of the article is directly acquired from the second weight detector installed on the unmanned aerial vehicle, the weight applied to the unmanned aerial vehicle can be acquired more accurately. This makes it possible to determine the overloaded state more accurately.

In the takeoff and landing system for an unmanned aerial vehicle according to one aspect of the present invention, the unmanned aerial vehicle may include a receiving unit configured to receive the control signal that controls the flight of the unmanned aerial vehicle, and a second controller configured to determine, based on the weight detected by the second weight detector and a predetermined reference value, whether it becomes an overloaded state when the article to deliver is loaded, and the second controller may prohibit operating based on the control signal received in the receiving unit upon determining that it becomes the overloaded state.

In this takeoff and landing system for an unmanned aerial vehicle, in the case of an overloaded state, the second controller controls itself so as not to take off, thereby preventing the takeoff of the unmanned aerial vehicle. Thus, as compared with providing the fixing device or the transmitting unit, the cost can be suppressed. Furthermore, when the fixing device is used in combination, the unmanned aerial vehicle in an overloaded state can be prevented from taking off more reliably.

The takeoff and landing system for an unmanned aerial vehicle according to one aspect of the present invention may include a picking device including a notification unit configured to make notification of a target product to pick from a product group accommodated in a product shelf, a receiving unit configured to receive presence of picking of the target product, and a weight estimation unit configured to estimate a total weight of the target product on the basis of the target product received in the receiving unit, and the above-described takeoff and landing device, and the weight acquisition unit may acquire the weight of the article from the weight estimation unit.

In this takeoff and landing system for an unmanned aerial vehicle, the weight of the article to be loaded on the unmanned aerial vehicle is estimated based on the presence of picking in the picking process. As for the weight of the article, by storing the weight of each product in advance, the total weight thereof can be estimated as soon as the picking is finished. As a result, because the weight of the product to be loaded on the unmanned aerial vehicle can be estimated easily, a system capable of preventing the unmanned aerial vehicle in an overloaded state from taking off can be constructed at low cost.

The takeoff and landing system for an unmanned aerial vehicle according to one aspect of the present invention may include an order receiving system including an order receiving unit configured to receive an order for a product via a network, a product-information storage unit configured to store therein product information in which the product and the weight of the product are associated with each other, and a weight estimation unit configured to estimate a total weight of the product on the basis of the product information and of the product for which the order is received in the order receiving unit, and the above-described takeoff and landing device, and the weight acquisition unit may acquire the weight of the article from the weight estimation unit.

In this takeoff and landing system for an unmanned aerial vehicle, the weight of the article to be loaded on the unmanned aerial vehicle is estimated based on the information on the product received via the network. As for the weight of the article, by storing the weight of each product in advance, as soon as the ordered product is determined, that is, as soon as the product to deliver is determined, the total weight thereof can be estimated. As a result, because the weight of the product to be loaded on the unmanned aerial vehicle can be estimated easily, a system capable of preventing the unmanned aerial vehicle in an overloaded state from taking off can be constructed at low cost.

An unmanned delivery system according to one aspect of the present invention is an unmanned delivery system including an unmanned aerial vehicle configured to deliver an article and a control device configured to control the unmanned aerial vehicle, and includes a weight acquisition unit configured to acquire a weight of an article, and a third controller configured to determine, based on the weight acquired by the weight acquisition unit and a predetermined reference value, whether it becomes an overloaded state when the article to deliver is loaded, and the third controller selectively switches, based on a determination result of whether it becomes the overloaded state, an operation mode to a delivery mode in which takeoff and landing are possible and a prohibition mode in which takeoff and landing are impossible.

In this unmanned delivery system, in the case of an overloaded state, by controlling the operation mode to the prohibition mode in which takeoff and landing are impossible, the third controller prevents the takeoff of the unmanned aerial vehicle. As a result, because the unmanned aerial vehicle in an overloaded state is unable to take off, the unmanned aerial vehicle can be prevented from flying in the overloaded state.

In the unmanned delivery system according to one aspect of the present invention, the weight acquisition unit and the third controller may be installed on the unmanned aerial vehicle.

The unmanned delivery system according to one aspect of the present invention may further include a remaining-amount acquisition unit configured to acquire a remaining amount of an energy source for a power source installed on the unmanned aerial vehicle, a flying-information storage unit configured to store therein flying information that is a relation among the weight of an article to be loaded on the unmanned aerial vehicle, the remaining amount, and a flying distance or flying time of the unmanned aerial vehicle, and a delivery-destination information acquisition unit configured to acquire a delivery distance or delivery time from the current location to a delivery destination of the article, and the third controller may determine whether the unmanned aerial vehicle is able to navigate to the delivery destination on the basis of the weight of the article acquired by the weight acquisition unit, the remaining amount acquired from the remaining-amount acquisition unit, the delivery distance or the delivery time acquired from the delivery-destination information acquisition unit, and the flying information, and may switch the operation mode to the prohibition mode upon determining that it is impossible to navigate and switch the operation mode to the delivery mode upon determining that it is possible to navigate.

In this unmanned delivery system, not only an overload but also whether the unmanned aerial vehicle is able to navigate to the delivery destination is determined, and based on the relevant determination, the unmanned aerial vehicle is permitted to take off. This makes it possible to make the unmanned aerial vehicle navigate more safely.

Advantageous Effects of Invention

According to one aspect of the present invention, an unmanned aerial vehicle can be made unable to fly in an overloaded state.

DESCRIPTION OF EMBODIMENTS

With reference to the accompanying drawings, the following describes exemplary embodiments. In the description of the drawings, identical constituent elements are denoted by identical reference signs, and redundant explanations are omitted.

First Embodiment

A takeoff and landing device 5 according to a first embodiment will be described. The takeoff and landing device 5 is a device arranged at a place where takeoff and landing of an unmanned aerial vehicle (UAV) 3 configured to deliver a package (article) B is performed. First, the UAV 3 will be described.

Figure 1:
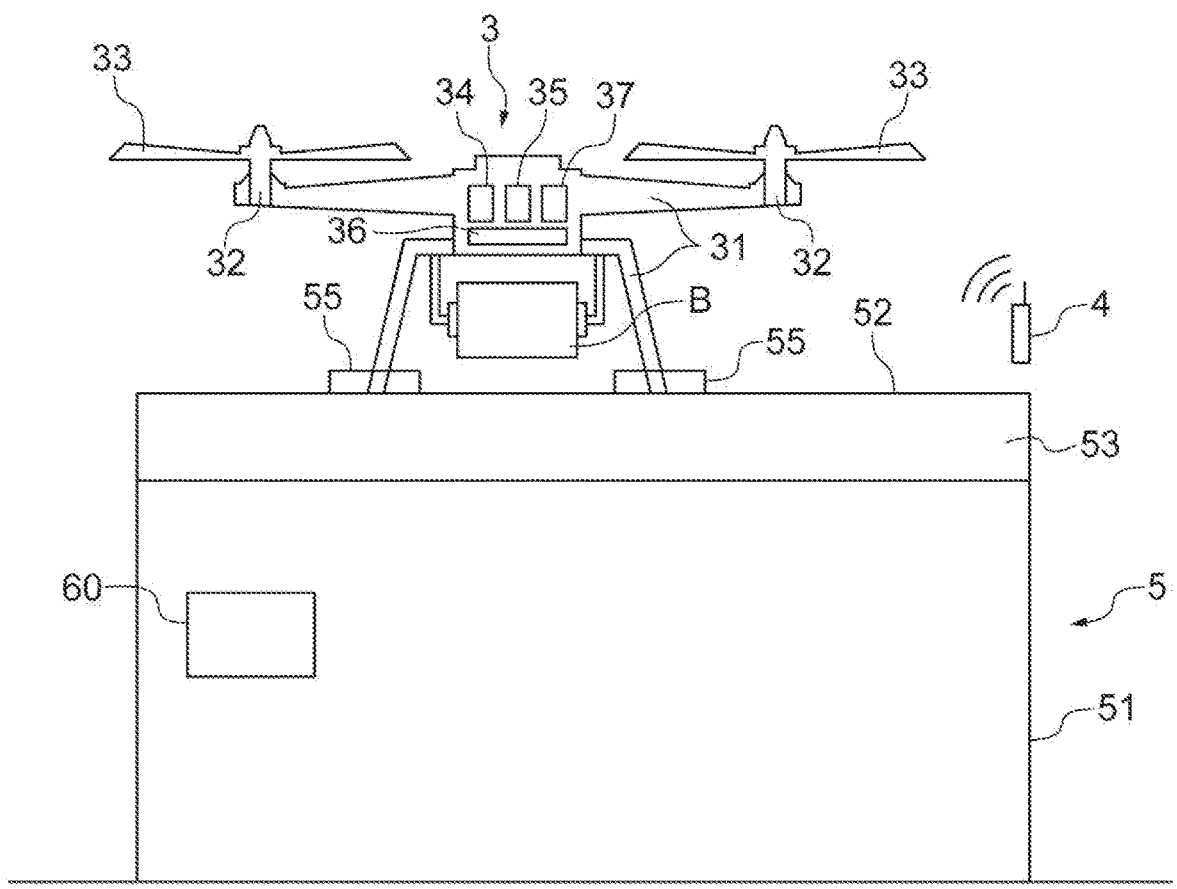
FIG. 1 is a configuration diagram of a takeoff and landing system according to a first embodiment.

The UAV 3 is an aircraft capable of flying, based on a control signal transmitted from a transmitter 4, in an unmanned manner by remote operation or automatic control (flight program). An example of the transmitter 4 is a controller configured to maneuver the UAV 3 or an antenna configured to transmit the flight program. When the UAV 3 stores therein the flight program in advance, the antenna may transmit a signal of activating the relevant flight program. As illustrated in FIG. 1, the UAV 3 mainly includes a frame 31, motors 32, propellers 33, a communication unit (receiving unit) 34, a battery 35, and a flight controller 37.

The frame 31 supports the motors 32, the propellers 33, the communication unit 34, the battery 35, and the flight controller 37. Examples of the material forming the frame 31 include nylon and carbon. The motors 32 are drive sources of the respective propellers 33 and are provided to the propellers 33. The communication unit 34 receives the control signal that controls the flight of the UAV 3 transmitted from the transmitter 4.

The battery 35 supplies electric power to various portions that need the electric power such as the motors 32, the communication unit 34, and the flight controller 37. An example of the battery 35 is a lithium polymer battery. The flight controller 37 executes, by controlling the revolving speed of each propeller 33 (rotation speed of the motor 32) and also controlling the relation of revolving speeds among a plurality of propellers 33, various controls such as ascending, descending, clockwise/counter-clockwise turning, moving forward, moving backward, and hovering of the UAV 3, for example.

Next, the takeoff and landing device 5 will be described. As illustrated in FIG. 1, the takeoff and landing device 5 includes a main unit 51 provided indoors or outdoors and anchored to the ground, a landing portion 52 having a flat surface on which the UAV 3 can take off and land, a weight detector (first weight detector) 53, fixing devices (takeoff prevention unit) 55, and a controller 60, for example.

The fixing device 55 is provided on the landing portion 52, and is a device configured to prevent the UAV 3 from taking off by fixing the frame 31 of the UAV 3 to the landing portion 52. The fixing device 55 can switch between a first state of preventing the takeoff of the UAV 3 by fixing the UAV 3 to the landing portion 52 and a second state of permitting the takeoff of the UAV 3 by releasing the fixing of the UAV 3 to the landing portion 52. The switching between the first state and the second state of the fixing device 55 is executed by the controller 60. The fixing device 55 may take a state of fixing the UAV 3 that is landed on the landing portion 52 as default (normal state).

The weight detector 53 is arranged below the landing portion 52 and detects the weight of the UAV 3 in a landed state on the landing portion 52. The weight detector 53 can use a device using a load cell, for example. The weight acquired by the weight detector 53 is output to the controller 60.

Figure 2:
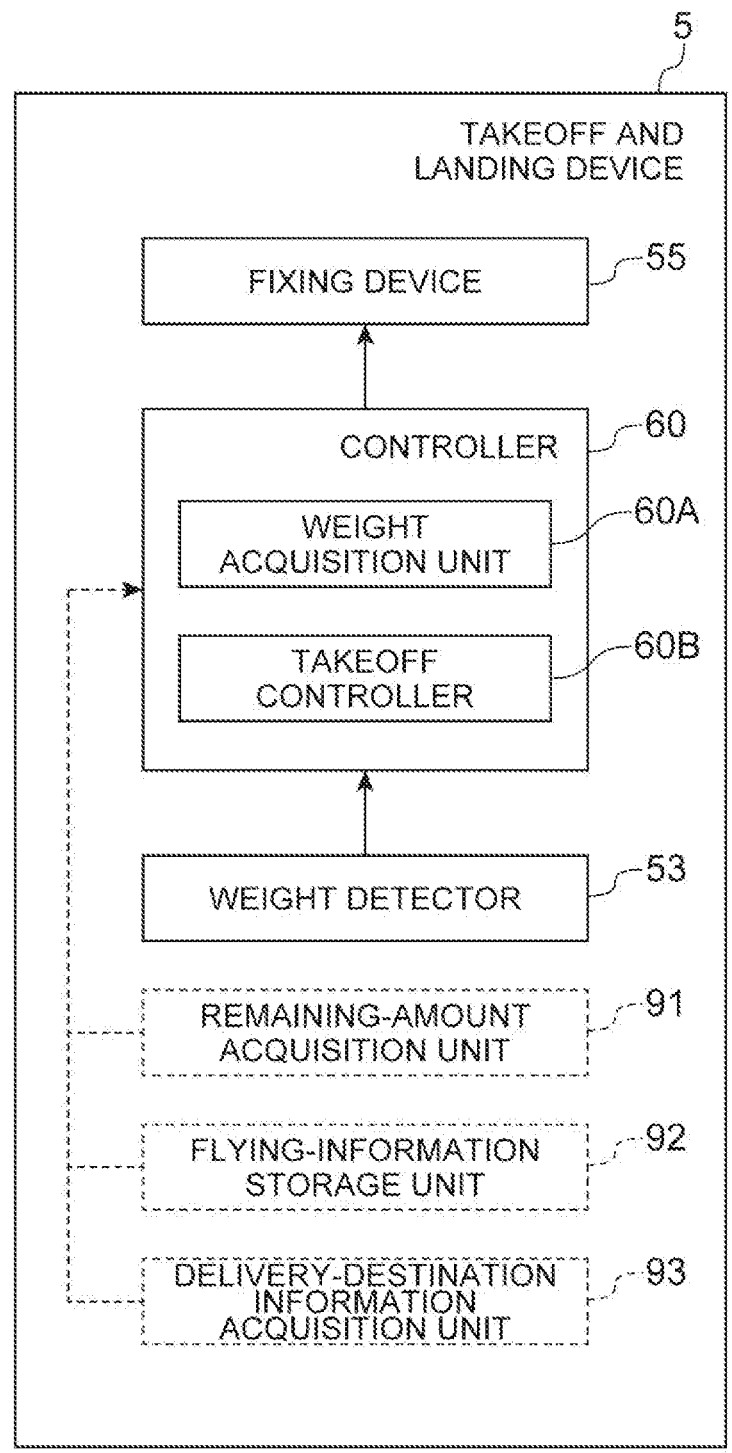
FIG. 2 is a functional block diagram of the takeoff and landing system in the first embodiment.

The controller 60 mainly has a non-depicted central processing unit (CPU), a read only memory (ROM), a random-access memory (RAM), and an auxiliary storage device such as a solid state drive (SSD), for example. The controller 60 executes various control processing for causing the UAV 3 to take off. As illustrated in FIG. 2, the controller 60 includes a weight acquisition unit 60A and a takeoff controller (first controller) 60B as conceptual portions to execute the various control processing for causing the UAV 3 to take off. Such conceptual portions are configured as a program stored in the ROM is loaded onto the RAM and is executed by the CPU, for example.

The weight acquisition unit 60A acquires the weight of the package B that the UAV 3 delivers. The weight acquisition unit 60A calculates, based on the weight of the UAV 3 stored in advance and the weight that the weight detector 53 detects, the weight of the package B loaded on the UAV 3. The weight acquisition unit 60A outputs the calculated weight of the package B to the takeoff controller 60B.

The takeoff controller 60B determines whether the UAV 3 is in an overloaded state on the basis of the weight of the package B calculated by the weight acquisition unit 60A and of a reference value stored in advance to determine whether it is an overload. The takeoff controller 60B switches, based on whether the UAV 3 that loads the package B is in an overloaded state, the state of the fixing device 55 to the first state or the second state. Specifically, the takeoff controller 60B controls the fixing device 55 so as to maintain fixing of the UAV 3 (or fixes the UAV 3 to the landing portion 52) upon determining that it is in an overloaded state, and controls the fixing device 55 so as to release the fixing of the UAV 3 (or maintains a state of releasing the fixing of the UAV 3) upon determining that it is not an overloaded state.

In the takeoff and landing device 5 of the above-described first embodiment, the controller 60 acquires the weight of the package B loaded on the UAV 3 that attempts to take off from the takeoff and landing device 5 and, upon determining that it becomes an overloaded state from the relevant weight, controls the fixing device 55 so as to fix the UAV 3 to the landing portion 52, thereby preventing the UAV 3 from taking off. As a result, when the UAV 3 that delivers the package B is obligated to take off from a specific takeoff and landing device by, for example, law and the like, the UAV 3 in an overloaded state is unable to take off from the takeoff and landing device 5 of the first embodiment. That is, the UAV 3 can be prevented from flying in the overloaded state.

In the above-described takeoff and landing device 5, as illustrated in FIG. 1, by fixing the UAV 3 to the landing portion 52, the fixing device 55 that prevents the UAV 3 from taking off is employed as a takeoff prevention unit. That is, in this takeoff and landing device 5, even if the UAV 3 attempts to take off, the UAV 3 is physically fixed to the takeoff and landing device 5 and thus is unable to take off. As a result, with a simple structure, the takeoff of the UAV 3 in an overloaded state can be prevented.

The weight detector 53 of the above-described takeoff and landing device 5 is a device using a load cell or the like that detects the weight of the UAV 3 in a landed state on the landing portion 52. In the takeoff and landing device 5 in this configuration, because the weight of the package B is directly measured by the weight detector 53, an overloaded state can be determined more accurately. Furthermore, as compared with a weight detector that is installed on the UAV 3, even a heavier weight can be accurately measured.

The above-described UAV 3 may, in the UAV 3 used in the first embodiment, include a weight detector 36 (second weight detector) (see FIG. 1) configured to detect the weight of the package B loaded on the UAV 3. An example of the weight detector 36 is a load cell. When the UAV 3 is provided with the weight detector 36, the controller 60 of the takeoff and landing device 5 may acquire the weight of the package B from the weight detector 36 and determine whether it is in an overloaded state. In this case, by providing on the takeoff and landing device 5 a communication unit 57 (see FIG. 3) capable of performing communication with the UAV 3, the weight acquisition unit 60A can acquire the weight of the package B acquired by the weight detector 36. In this configuration, because the weight of the package B is directly acquired from the weight detector 36 installed on the UAV 3, the weight applied to the UAV 3 can be acquired more accurately. This makes it possible to determine an overloaded state more accurately.

The controller 60 may, based on both values of the weight of the package B acquired by the weight detector 36 and the weight of the package B acquired by the weight detector 53 (for example, an average value of both values, or the value that is greater), determine an overloaded state.

Second Embodiment

Figure 3:
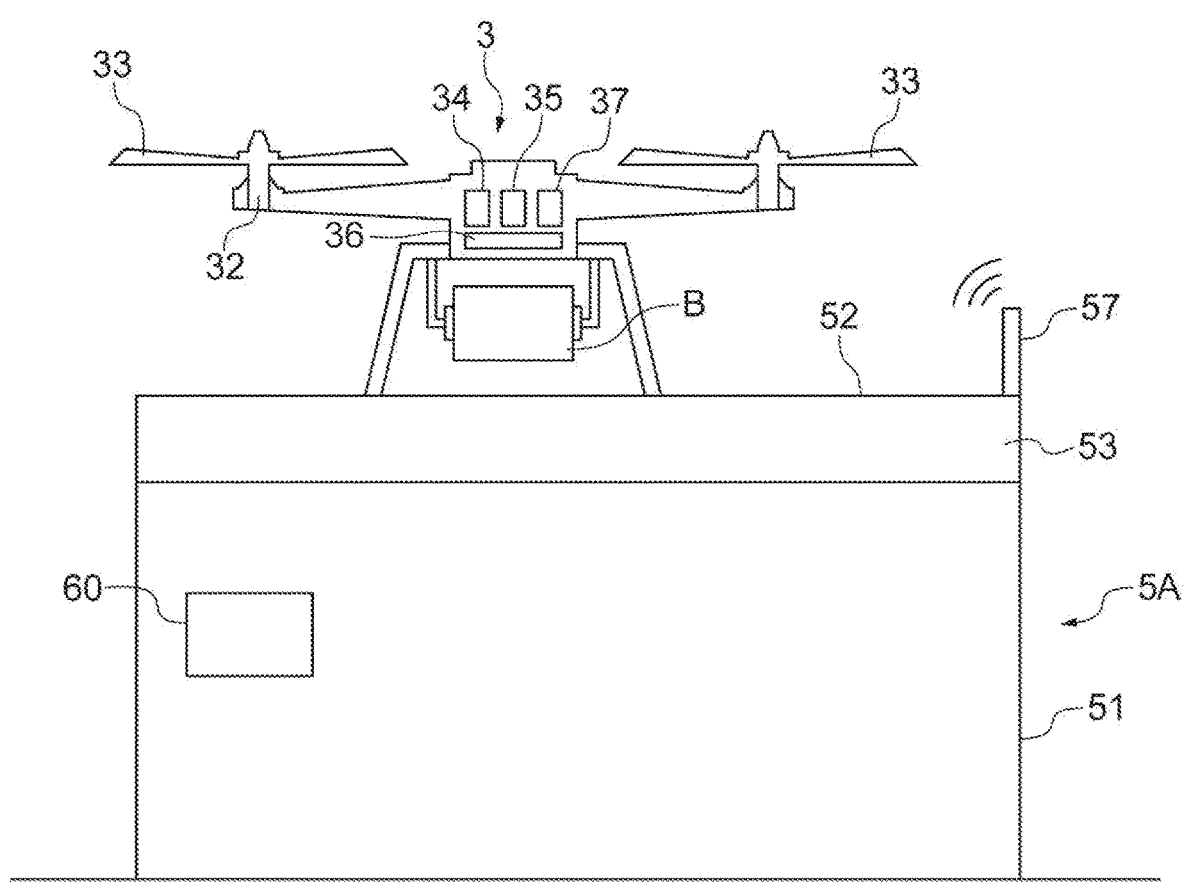
FIG. 3 is a configuration diagram of a takeoff and landing system according to a second embodiment.
Figure 4:
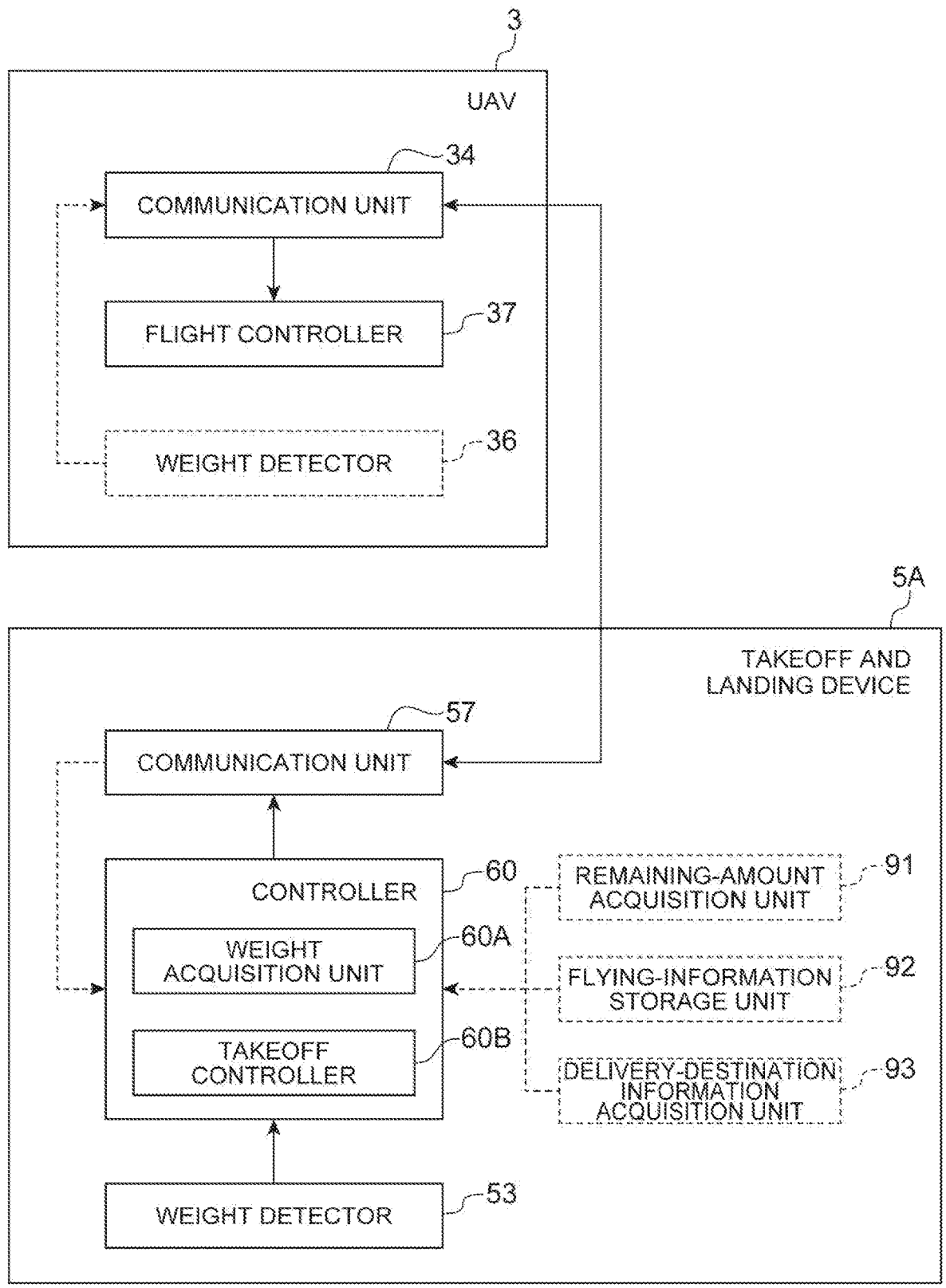
FIG. 4 is a functional block diagram of the takeoff and landing system in the second embodiment.

Next, a takeoff and landing device 5A according to a second embodiment will be described. As illustrated in FIG. 3 and FIG. 4, the takeoff and landing device 5A includes the communication unit (transmission unit) 57 in lieu of removing the fixing device 55 from the configuration of the takeoff and landing device 5 of the first embodiment. The communication unit 57 transmits to the UAV 3 the flight program, or an activation signal that causes the UAV 3 to activate a program stored in advance (hereinafter, both are referred to as "control signal"). The description of portions of the configuration the same as that of the first embodiment will be omitted.

The takeoff controller 60B can switch, based on whether the UAV 3 that loads the package B is in an overloaded state, between a first state of prohibiting the transmission of the above-described signal in the communication unit 57 and a second state of permitting the transmission of the control signal. Specifically, the takeoff controller 60B prohibits the control signal from being transmitted from the communication unit 57 upon determining that it is in an overloaded state, and permits the control signal to be transmitted from the communication unit 57 upon determining that it is not in an overloaded state.

In the takeoff and landing device 5A of the above-described second embodiment, the controller 60 acquires the weight of the package B loaded on the UAV 3 that attempts to take off from the takeoff and landing device 5A and, upon determining that it becomes an overloaded state from the relevant weight, performs the control so as to prohibit transmitting the control signal from the communication unit 57, thereby preventing the UAV 3 from taking off. That is, unless the control signal is transmitted from the communication unit 57, the communication unit 34 installed on the UAV 3 never receives the control signal and the flight controller 37 never executes the control concerning the flight. Meanwhile, if the control signal is transmitted from the communication unit 57, the communication unit 34 installed on the UAV 3 receives the control signal and the flight controller 37 executes the control concerning the flight. As a result, when the UAV 3 that delivers the package B is obligated to take off from a specific takeoff and landing device by, for example, law and the like, the UAV 3 in an overloaded state is unable to take off from the takeoff and landing device 5A of the second embodiment. That is, the UAV 3 can be prevented from flying in the overloaded state.

In the above-described takeoff and landing device 5A, the communication unit 57 is employed as a takeoff prevention unit that, by not transmitting the control signal that causes the UAV 3 to perform a flight operation, prevents the UAV 3 from taking off. That is, in this takeoff and landing device 5A, because the control signal that causes the UAV 3 to attempt to take off is not transmitted, the UAV 3 never takes off. As a result, with a simple configuration, the takeoff of the UAV 3 in an overloaded state can be prevented.

In the UAV 3 of the second embodiment also, the weight detector 36 may be provided. When the UAV 3 is provided with the weight detector 36, the controller 60 of the takeoff and landing device 5A may determine, based on the weight of the package B acquired by the weight detector 36, whether it is in an overloaded state.

Third Embodiment

Figure 5:
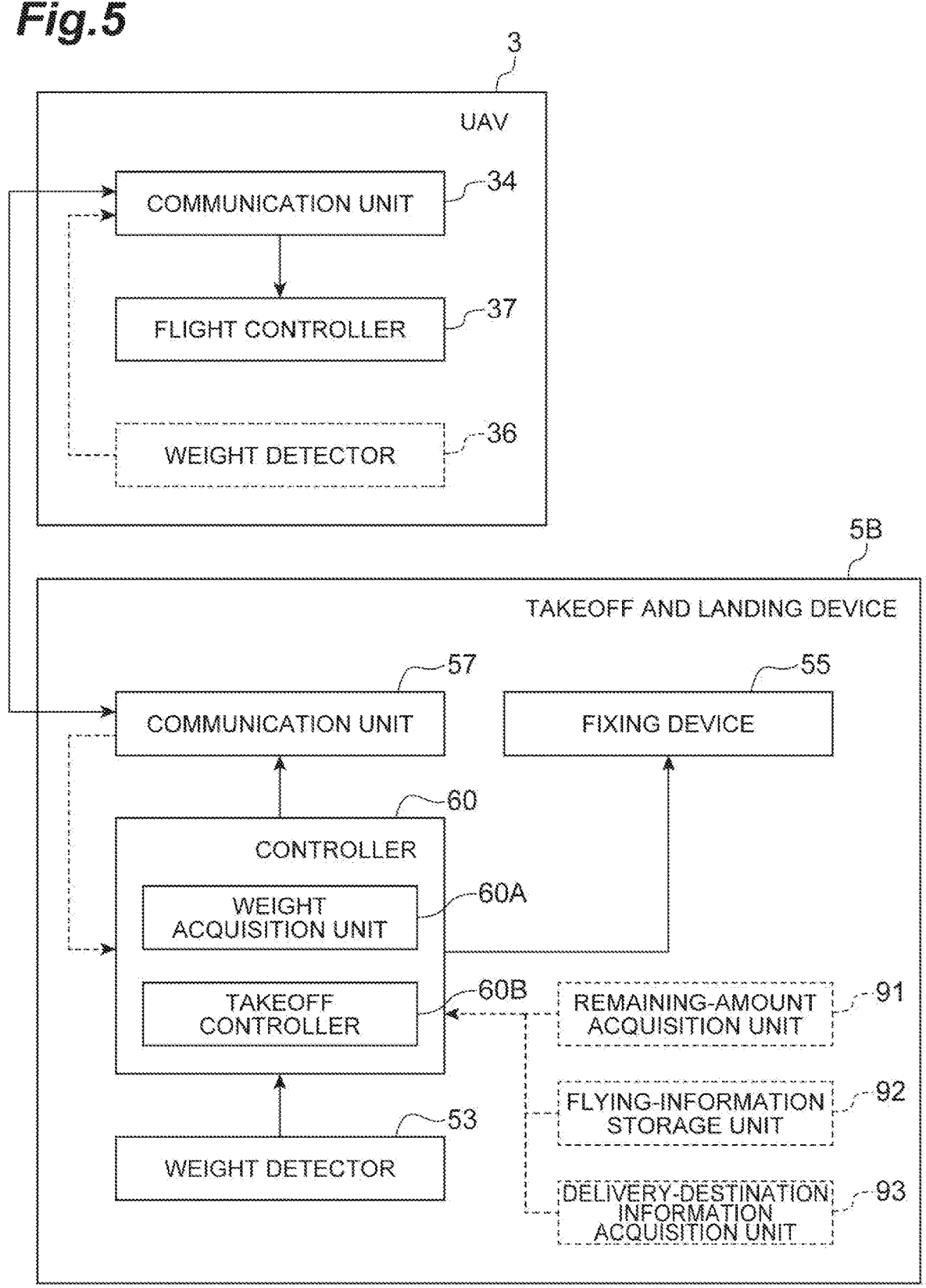
FIG. 5 is a functional block diagram of a takeoff and landing system according to a third embodiment.

Next, a takeoff and landing device 5B according to a third embodiment will be described. As illustrated in FIG. 5, the takeoff and landing device 5B includes the communication unit 57 described in the second embodiment, in addition to the configuration of the takeoff and landing device 5 of the first embodiment. The communication unit 57 transmits the control signal to the UAV 3. The description of portions of the configuration the same as that of the first embodiment and the second embodiment will be omitted.

The takeoff controller 60B, upon determining that it is in an overloaded state, controls the fixing device 55 so as to maintain fixing of the UAV 3 (or fixes the UAV 3 to the landing portion 52) and prohibits the control signal from being transmitted from the communication unit 57 and, upon determining that it is not in an overloaded state, controls the fixing device 55 so as to release the fixing of the UAV 3 (or maintains a state of releasing the fixing of the UAV 3) and permits the control signal to be transmitted from the communication unit 57.

In the takeoff and landing device 5B of the third embodiment also, as with the above-described first embodiment and the second embodiment, the UAV 3 can be prevented from flying in the overloaded state.

Moreover, in the above-described takeoff and landing device 5B, both the fixing device 55 that prevents the UAV 3 from taking off by fixing the UAV 3 to the landing portion 52 and the communication unit 57 that prevents the UAV 3 from taking off by not transmitting the control signal that causes the UAV 3 to perform a flight operation are employed as a takeoff prevention unit. As a result, even if one of the fixing device 55 and the communication unit 57 is erroneously controlled by the controller 60, as long as the other is correctly controlled, the UAV 3 can be prevented from flying in the overloaded state.

In the UAV 3 of the third embodiment also, the weight detector 36 may be provided. When the UAV 3 is provided with the weight detector 36, the controller 60 of the takeoff and landing device 5B may determine, based on the weight of the package B acquired by the weight detector 36, whether it is in an overloaded state.

Fourth Embodiment

Figure 6:
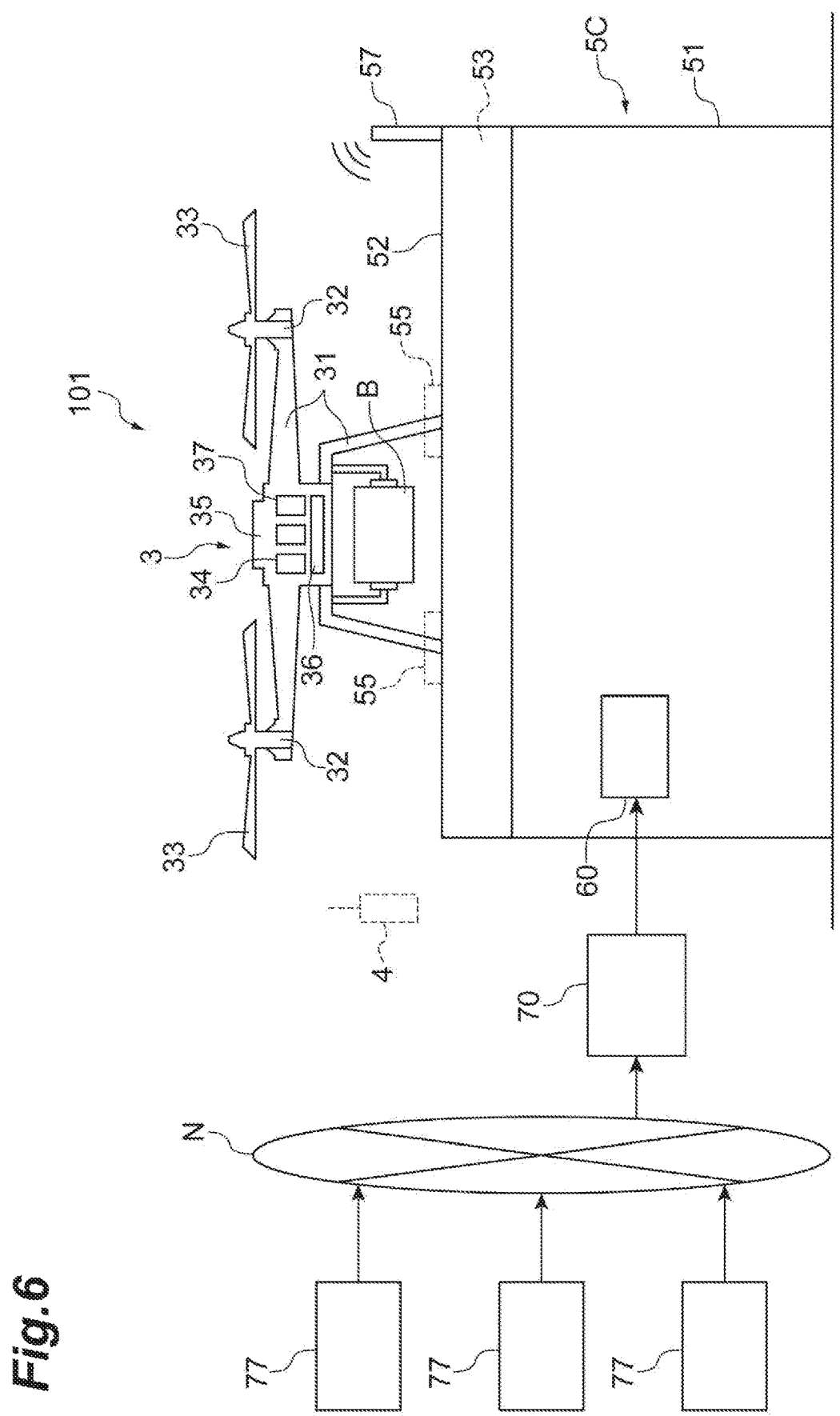
FIG. 6 is a configuration diagram of a takeoff and landing system according to a fourth embodiment.

Next, a takeoff and landing system 101 according to a fourth embodiment will be described. As illustrated in FIG. 6, the takeoff and landing system 101 includes the UAV 3 described in the first embodiment, a takeoff and landing device 5C of a configuration in which the weight detector 53 is removed from the takeoff and landing device 5A of the second embodiment, and an order receiving server (order receiving system) 70. The description of the configuration the same as that of the first, the second, and the third embodiments will be omitted.

Figure 7:
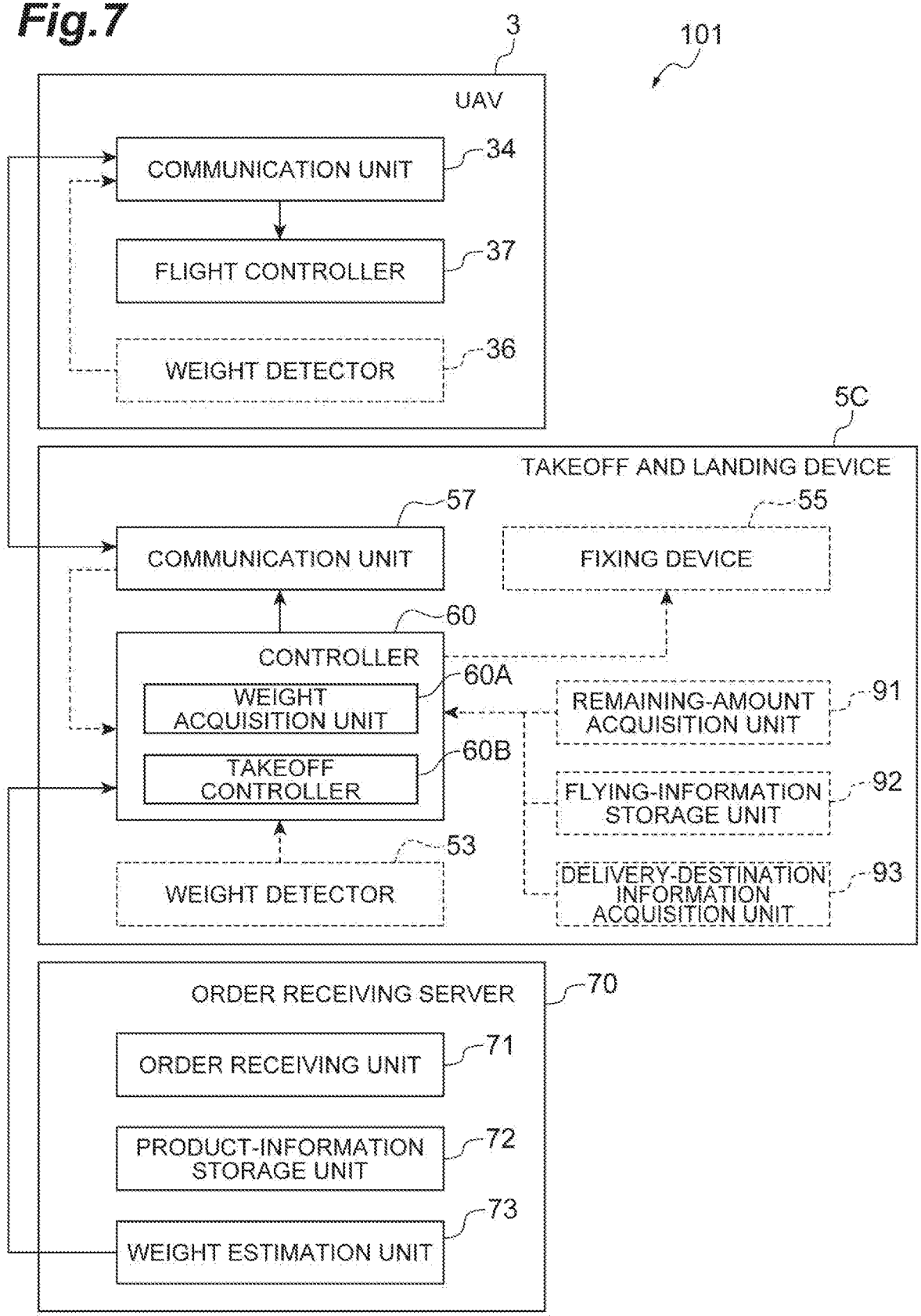
FIG. 7 is a functional block diagram of the takeoff and landing system in the fourth embodiment.

The order receiving server 70 is communicably connected to the controller 60 via a network. The order receiving server 70 includes a CPU, a ROM, and a RAM not depicted. As illustrated in FIG. 7, the order receiving server 70 includes an order receiving unit 71, a product-information storage unit 72, and a weight estimation unit 73 as conceptual portions that execute various control processing for receiving product orders via the network. Such conceptual portions are configured as a program stored in the ROM is loaded onto the RAM and is executed by the CPU, for example.

The order receiving unit 71 receives a product order from a terminal device 77 capable of connecting via a network N. Examples of the terminal device 77 include a personal computer and a smartphone. The product-information storage unit 72 stores therein product information in which a product is associated with the weight of the product. Examples of the product-information storage unit 72 include a hard disk drive (HDD) and a solid state drive (SSD). The weight estimation unit 73 estimates, on the basis of the product information and of the product for which the order was received by the order receiving unit, the total weight of the product.

The package B that the UAV 3 delivers is received by the order receiving unit 71 and is associated with the weight estimated by the weight estimation unit 73. The weight acquisition unit 60A acquires from the weight estimation unit 73 the weight of the package B that the UAV 3 delivers. The weight acquisition unit 60A outputs the calculated weight of the package B to the takeoff controller 60B.

The takeoff controller 60B determines whether the UAV 3 is in an overloaded state on the basis of the weight of the package B estimated by the weight estimation unit 73 and of a reference value stored in advance to determine whether it is an overload. The takeoff controller 60B prohibits the control signal from being transmitted from the communication unit 57 upon determining that it is in an overloaded state, and permits the control signal to be transmitted from the communication unit 57 upon determining that it is not in an overloaded state. That is, unless the control signal is transmitted from the communication unit 57, the communication unit 34 installed on the UAV 3 never receives the control signal and the flight controller 37 never executes the control concerning the flight. Meanwhile, if the control signal is transmitted from the communication unit 57, the communication unit 34 installed on the UAV 3 receives the control signal and the flight controller 37 executes the control concerning the flight.

In the takeoff and landing system 101 of the fourth embodiment also, as with the above-described first, the second, and the third embodiments, the UAV 3 can be prevented from flying in the overloaded state. Moreover, in the above-described takeoff and landing system 101, as compared with the configuration in which the weight detector 36 is provided on each UAV 3 or the weight detector 53 is provided on the takeoff and landing device 5, the cost can be suppressed.

In the UAV 3 of the fourth embodiment also, the weight detector 36 may be provided. Furthermore, in the takeoff and landing device 5C, the weight detector 53 may be provided. In these cases, whether the UAV 3 is in an overloaded state may be determined by considering, in addition to the weight of the package B acquired by the weight estimation unit 73, the weight of the package B acquired by at least one of the weight detector 36 and the weight detector 53.

Fifth Embodiment

Figure 8:
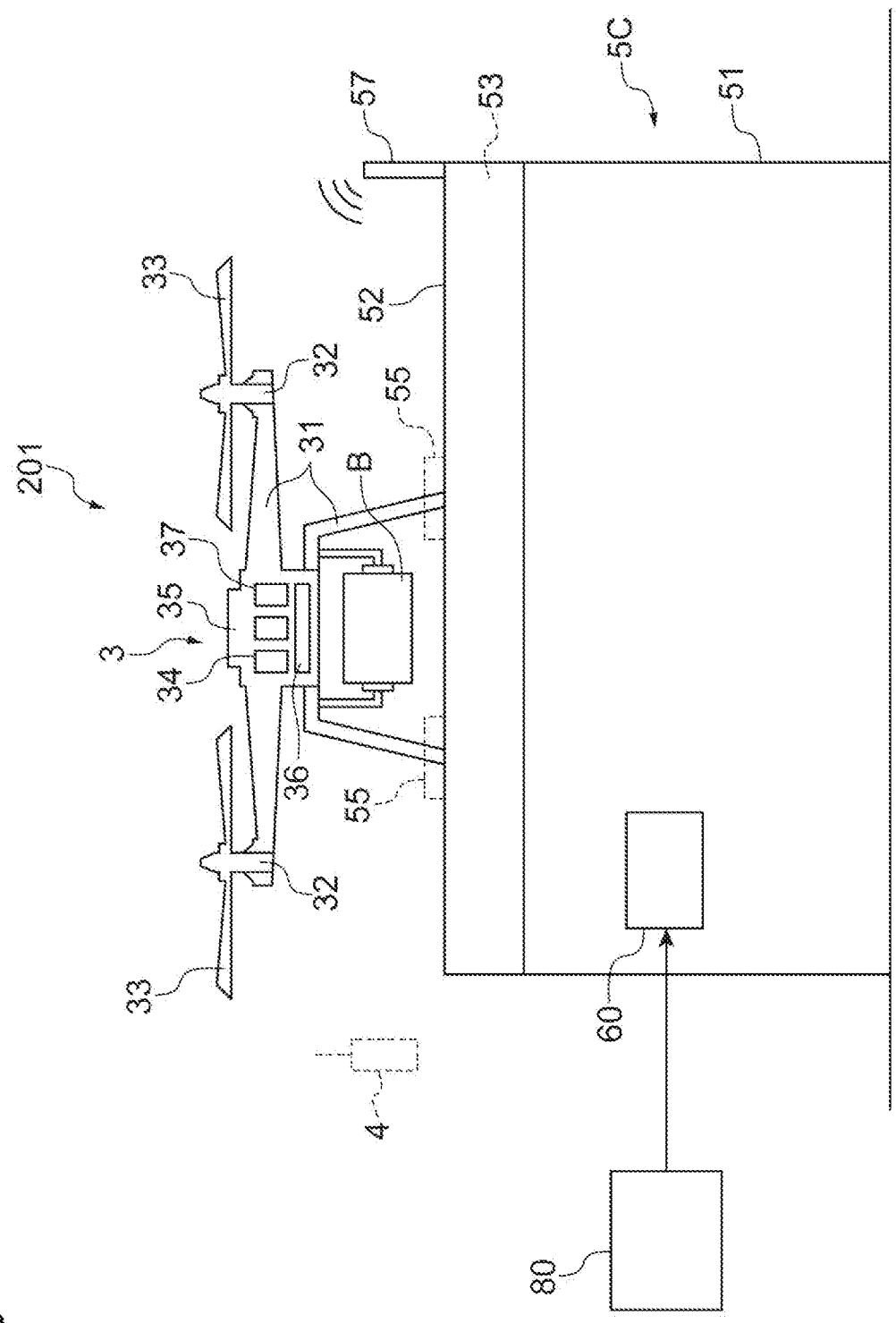
FIG. 8 is a configuration diagram of a takeoff and landing system according to a fifth embodiment.

Next, a takeoff and landing system 201 according to a fifth embodiment will be described. As illustrated in FIG. 8, the takeoff and landing system 201 includes the UAV 3 described in the first embodiment, the takeoff and landing device 5C of the configuration in which the weight detector 53 is removed from the takeoff and landing device 5A of the second embodiment, and a picking device 80. The description of the configuration the same as that of the first, the second, and the third embodiments will be omitted.

Figure 9:
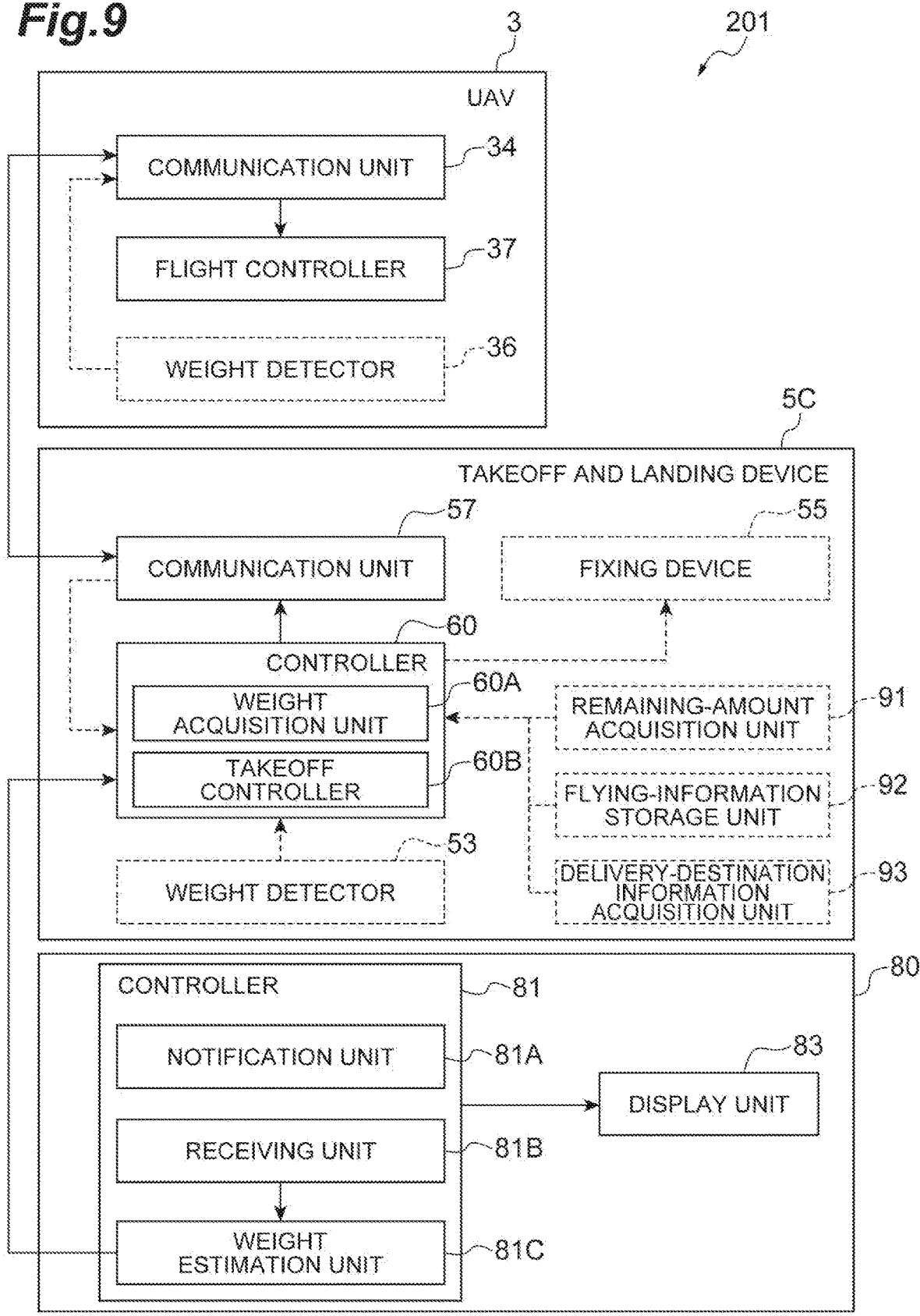
FIG. 9 is a functional block diagram of the takeoff and landing system in the fifth embodiment.

The picking device 80 is a device that assists picking work and is a device that, by displaying on a display unit 83 or the like a product name, quantity, and the like for a worker to pick, performs management of whether picking was carried out actually by the worker. The picking device 80 is communicably connected to the controller 60 via a network. As illustrated in FIG. 9, the picking device 80 includes the display unit 83 and a controller 81.

The controller 81 includes a CPU, a ROM, and a RAM not depicted. The controller 81 includes a notification unit 81A, a receiving unit 81B, and a weight estimation unit 81C as conceptual portions that execute various control processing for assisting the picking. Such conceptual portions are configured as a program stored in the ROM is loaded onto the RAM and is executed by the CPU, for example.

The notification unit 81A makes notification of product information (product name, quantity, and the like) concerning the product to pick from product groups accommodated in product shelves. The notification unit 81A notifies the worker by displaying the product information on the display unit 83. The receiving unit 81B receives the presence of picking of the target product. The receiving unit 81B includes, for example, a scanner, and receives the fact, by scanning the picked product with the scanner, that the picking was completed. The weight estimation unit 81C estimates, based on the target product received at the receiving unit 81B, the total weight of the target product. The weight estimation unit 81C sends the estimated total weight of the target product to the controller 60 of the takeoff and landing device 5C.

The display unit 83 is, for example, a liquid crystal display or a touch panel display, and the product information (product name, quantity, and the like) is displayed by the control of the notification unit 81A.

The product picked by the picking device 80 is received by the controller 81 as the package B that the UAV 3 delivers, and is associated with the weight estimated by the weight estimation unit 81C. The weight acquisition unit 60A acquires from the weight estimation unit 81C the weight of the package B that the UAV 3 delivers. The weight acquisition unit 60A outputs the acquired weight of the package B to the takeoff controller 60B.

The takeoff controller 60B determines whether the UAV 3 is in an overloaded state on the basis of the weight of the package B estimated by the weight estimation unit 81C and of a reference value stored in advance to determine whether it is an overload. The takeoff controller 60B prohibits the control signal from being transmitted from the communication unit 57 upon determining that it is in an overloaded state, and permits the control signal to be transmitted from the communication unit 57 upon determining that it is not in an overloaded state.

In the takeoff and landing system 201 of the fifth embodiment also, as with the above-described first, the second, the third, and the fourth embodiments, the UAV 3 can be prevented from flying in the overloaded state. Moreover, in the above-described takeoff and landing system 201, as compared with the configuration in which the weight detector 36 is provided on each UAV 3 or the weight detector 53 is provided on the takeoff and landing device 5, the cost can be suppressed.

In the UAV 3 of the fifth embodiment also, the weight detector 36 may be provided. Furthermore, in the takeoff and landing device 5C, the weight detector 53 may be provided. In these cases, whether the UAV 3 is in an overloaded state may be determined by considering, in addition to the weight of the package B acquired by the weight estimation unit 81C, the weight of the package B acquired by at least one of the weight detector 36 and the weight detector 53.

Sixth Embodiment

Figure 10:
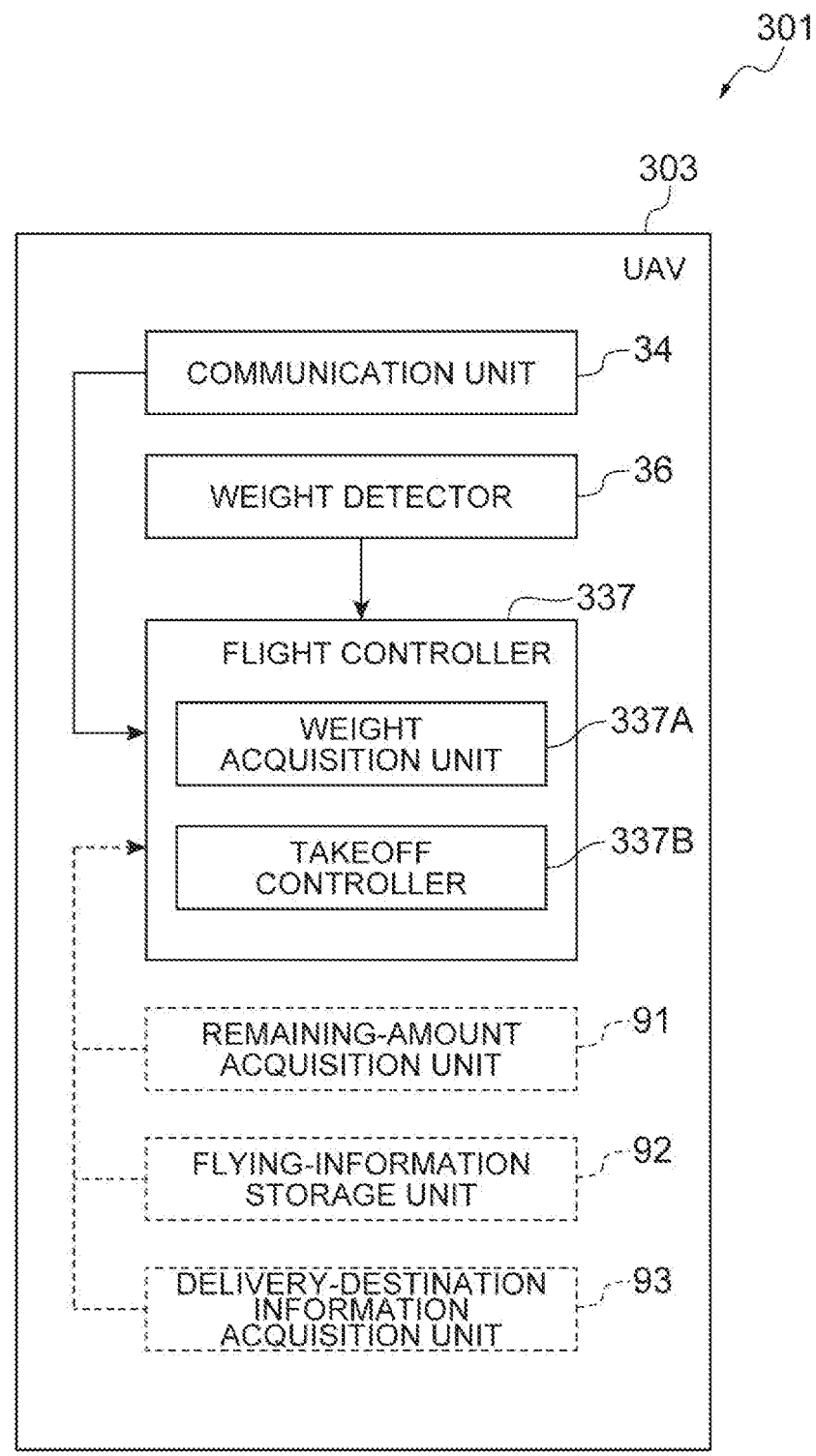
FIG. 10 is a functional block diagram of an unmanned delivery system according to a sixth embodiment.

Next, with reference to FIG. 1 and FIG. 10, an unmanned delivery system 301 according to a sixth embodiment will be described. As illustrated in FIG. 10, the unmanned delivery system 301 is made up of a UAV 303 and a control device. The UAV 303 delivers the package B to the residence of an orderer from a predetermined location (for example, a delivery center). The UAV 303 may, in addition to the configuration of the UAV 3 described in the first embodiment, include the weight detector 36 configured to detect the weight of the package B loaded on the UAV 303. An example of the weight detector 36 is a load cell. The control device in the sixth embodiment is a flight controller 337 installed on the UAV 303 and controls the flight of the UAV 303. Furthermore, the flight controller 337 executes not only the control of the flight of the UAV 303 but also switching of an operation mode based on the presence of an overloaded state as described later.

The flight controller 337 includes a CPU, a ROM, and a RAM not depicted. The flight controller 337 executes various control processing for causing the UAV 303 to take off. The flight controller 337 includes a weight acquisition unit 337A and a takeoff controller 337B as conceptual portions to execute the various control processing for causing the UAV 303 to take off. Such conceptual portions are configured as a program stored in the ROM is loaded onto the RAM and is executed by the CPU, for example.

The weight acquisition unit 337A acquires the weight of the package B that the UAV 303 delivers. The weight acquisition unit 337A acquires the weight of the package B from the weight detector 36. The weight acquisition unit 337A outputs the acquired weight of the package B to the takeoff controller 337B.

The takeoff controller (second controller or third controller) 337B determines, on the basis of the weight acquired by the weight acquisition unit 337A and of a predetermined reference value, whether it becomes an overloaded state when the package B to deliver is loaded. The takeoff controller 337B selectively switches, based on the determination result of whether it becomes an overloaded state, the operation mode of the UAV 303 between a delivery mode in which takeoff and landing are possible and a prohibition mode in which takeoff and landing are impossible.

In the UAV 303 of the sixth embodiment, in the case of an overloaded state, by controlling the operation mode to the prohibition mode in which takeoff and landing are impossible, the takeoff controller 337B prevents the takeoff of the UAV 303. As a result, because the UAV 303 in an overloaded state is unable to take off, the UAV 303 can be prevented from flying in the overloaded state. The determination of the presence of an overloaded state in the takeoff controller 337B may be executed at the timing of loading the package B, or may be executed at the timing that the UAV 303 attempts to fly.

In the sixth embodiment, it has been exemplified that the weight acquisition unit 337A and the takeoff controller 337B are installed on the UAV 303. However, they may be arranged in the delivery center, or in the takeoff and landing device 5, 5A, 5B, or 5C described in the above-described first to the fifth embodiments, for example. Furthermore, it has been exemplified that the weight acquisition unit 337A acquires the weight of the package B from the weight detector 36 installed on the UAV 303. However, the weight of the package B may be acquired from the weight detector 53 arranged in the takeoff and landing device 5 as in the first embodiment, the weight of the package B may be acquired from the weight estimation unit 73 of the order receiving server 70 as in the fourth embodiment, and the weight of the package B may be acquired from the weight estimation unit 81C of the picking device 80 as in the fifth embodiment, for example.

As in the foregoing, exemplary embodiments of one aspect of the present invention have been described, but one aspect of the present invention is not limited to the above-described embodiments.

It has been exemplified that the takeoff controller 60B or 337B of the above-described first to the sixth embodiments determines whether it is an overload, on the basis of a simple comparison between the reference value to determine the overload and the weight value of the package B acquired by the weight detector 36 or 53, but the embodiments are not limited thereto. For example, whether it is an overload may be determined on the basis of the comparison between the weight value of the package B and of a reference value altered in accordance with meteorological information (wind velocity, weather), a flight route, type of a load, and the like.

For example, when delivering the package B by the UAV 3, not only an overload but also whether it is possible to fly up to the delivery destination may be determined. In this case, the UAV 3 or 303 or the takeoff and landing system 101 or 201, as illustrated in FIG. 2, FIG. 4, FIG. 5, FIG. 7, FIG. 9, and FIG. 10, is further provided with a remaining-amount acquisition unit 91 configured to acquire the remaining amount of the energy source for the power source installed on the UAV 3 or 303, a flying-information storage unit 92 configured to store therein flying information that is a relation among the weight of the package B to be loaded on the UAV 3 or 303, the remaining amount of the energy source, and the flying distance or flying time of the UAV 3 or 303, and a delivery-destination information acquisition unit 93 configured to acquire the delivery distance or delivery time from the current location to the delivery destination of the package B.

Examples of the power source include a motor and an engine, and examples of the energy source include electric power and fuel. The remaining-amount acquisition unit 91 can acquire the above-described remaining amount from known means such as a detection device or a sensor that detects the remaining amount of the electric power stored in the battery 35 or the fuel stored in a fuel tank.

Then, the takeoff controller 60B or 337B may, based on the weight of the package B acquired by the weight acquisition unit 60A or 337A, the remaining amount of the energy source acquired by the remaining-amount acquisition unit 91, the delivery distance or delivery time acquired from the delivery-destination information acquisition unit 93, and the flying information, determine whether the UAV 3 or 303 is able to navigate to the delivery destination. The takeoff controller 60B or 337B switches the state of the takeoff prevention unit (at least one of the fixing device 55 and the communication unit 57) into a non-navigable state (prohibition mode) upon determining that the navigation is impossible, and switches the state of the takeoff prevention unit into a navigable state (delivery mode) upon determining that the navigation is possible.

Examples of the flying information include table information and relational expressions obtainable from experiments and the like. That is, the takeoff controller 60B or 337B can directly derive the flying distance or flying time of the UAV 3 or 303 on the basis of the above-described table information and the relational expressions, if the weight of the package B and the remaining amount of the energy source are acquired from the weight acquisition unit 60A or 337A and the remaining-amount acquisition unit 91, respectively. Then, the takeoff controller 60B or 337B compares the flying distance or the flying time thus derived with the delivery distance or the delivery time acquired from the delivery-destination information acquisition unit 93, and determines whether the package B can be conveyed to the delivery destination.

Furthermore, the flying-information storage unit 92 may store therein the relational expression or the table information that, when loading and conveying the package B of 100 g, the flying time becomes 1 minute shorter relative to the reference flying time, for example. This relational expression may be a linear relation, and the table information may be a two-dimensional table obtainable from experiments and the like. In this case, the takeoff controller 60B or 337B can indirectly derive, from the remaining amount of the energy source at the present moment, the time in which flying can be continued when the package B is not loaded. For example, the takeoff controller 60B or 337B determines that, when the package B is not loaded, 60 minutes of flying is possible. Subsequently, when it is acquired that the weight of the package B concerning the conveying is, for example, 500 g, the takeoff controller 60B or 337B determines that the flying time becomes 5 minutes shorter relative to the reference flying time. Accordingly, the takeoff controller 60B or 337B corrects the 60 minutes that is the original flying time, and corrects the actual flying time to 55 minutes. The takeoff controller 60B or 337B may determine, based on the flying time after correction and the delivery time acquired from the delivery-destination information acquisition unit 93, whether the package B can be conveyed to the delivery destination.

REFERENCE SIGNS LIST 3, 303 UAV (UNMANNED AERIAL VEHICLE)
34 COMMUNICATION UNIT

36 WEIGHT DETECTOR (SECOND WEIGHT DETECTOR)
37 FLIGHT CONTROLLER
5, 5A, 5B, 5C TAKEOFF AND LANDING DEVICE
51 MAIN UNIT
52 LANDING PORTION
53 WEIGHT DETECTOR (FIRST WEIGHT DETECTOR)
55 FIXING DEVICE
57 COMMUNICATION UNIT (TRANSMISSION UNIT)
60 CONTROLLER
60A WEIGHT ACQUISITION UNIT
60B TAKEOFF CONTROLLER (FIRST CONTROLLER)
70 ORDER RECEIVING SERVER
71 ORDER RECEIVING UNIT
72 PRODUCT-INFORMATION STORAGE UNIT
73 WEIGHT ESTIMATION UNIT
80 PICKING DEVICE
81 CONTROLLER
81A NOTIFICATION UNIT
81B RECEIVING UNIT
81C WEIGHT ESTIMATION UNIT
101, 201 TAKEOFF AND LANDING SYSTEM
301 UNMANNED DELIVERY SYSTEM
B PACKAGE (ARTICLE)
337 FLIGHT CONTROLLER
337A WEIGHT ACQUISITION UNIT
337B TAKEOFF CONTROLLER (SECOND CONTROLLER, THIRD CONTROLLER)

The invention claimed is:

1. A takeoff and landing device for an unmanned aerial vehicle configured to deliver an article, the takeoff and landing device allowing the unmanned aerial vehicle to perform taking off and landing, and comprising a first controller including a processor and a memory, the first controller being configured to:
   switch between a first state that is a state of preventing the unmanned aerial vehicle from taking off from the takeoff and landing device and a second state that is a state of not preventing takeoff;
   acquire a weight of the article that the unmanned aerial vehicle delivers;
   determine a change in a flying distance or flying time of the unmanned aerial vehicle caused by the article being loaded on the unmanned aerial vehicle and based on the acquired weight of the article; and
   switch to the first state or the second state based on the weight of the article acquired, a reference value for determining whether the weight of the article is an overload, and the change in the flying distance or flying time.

2. The takeoff and landing device according to claim 1, wherein
   the processor is configured to switch between the first state, in which the unmanned aerial vehicle is physically fixed to the takeoff and landing device, and the second state, in which the physical fixing of the unmanned aerial vehicle to the takeoff and landing device is released.

3. The takeoff and landing device according to claim 1, the first controller being further configured to:
   transmit a control signal that causes the unmanned aerial vehicle to perform a flight operation, and
   switch between the first state, in which transmission of the control signal is prohibited, and the second state, in which the transmission of the control signal is permitted.

4. The takeoff and landing device according to claim 1, further comprising a first weight detector configured to measure the weight of the article, which is to be delivered by the unmanned aerial vehicle, wherein
   the first controller acquires the weight of the article from the first weight detector.

5. The takeoff and landing device according to claim 1, the first controller being further configured to:
   acquire a remaining amount of an energy source for a power source installed on the unmanned aerial vehicle;
   store flying information that is a relation among the weight of the article, which is to be loaded on the unmanned aerial vehicle; the remaining amount; and the flying distance or flying time of the unmanned aerial vehicle;
   acquire a delivery distance or delivery time from a current location to a delivery destination of the article;
   determine whether the unmanned aerial vehicle is able to navigate to the delivery destination based on the weight of the article, the remaining amount, the delivery distance or delivery time, and the flying information; and
   switch to the first state upon determining that the unmanned aerial vehicle is unable to navigate to the delivery destination, and switch to the second state upon determining that the unmanned aerial vehicle is able to navigate to the delivery destination.

6. An unmanned delivery system comprising:
   an unmanned aerial vehicle configured to deliver an article;
   a controller configured to:
     control the unmanned aerial vehicle;
     acquire a weight of the article;
     determine, based on the weight of the article and a predetermined reference value, whether the unmanned aerial vehicle enters an overloaded state when the article to deliver is loaded; and
     determine a change in a flying distance or flying time of the unmanned aerial vehicle caused by the article being loaded and based on the acquired weight of the article, wherein
   based on a determination result of whether the unmanned aerial vehicle enters the overloaded state and the change in the flying distance or flying time, the controller selectively switches an operation mode between:
     a delivery mode in which takeoff and landing are possible, and
     a prohibition mode in which takeoff and landing are impossible.

7. The unmanned delivery system according to claim 6, wherein the controller is installed on the unmanned aerial vehicle.

8. The unmanned delivery system according to claim 6, the controller being further configured to:
   acquire a remaining amount of an energy source for a power source installed on the unmanned aerial vehicle;
   store flying information that is a relation among the weight of the article, which is to be loaded on the unmanned aerial vehicle; the remaining amount; and the flying distance or flying time of the unmanned aerial vehicle;
   acquire a delivery distance or delivery time from a current location to a delivery destination of the article;

determine whether the unmanned aerial vehicle is able to navigate to the delivery destination based on the weight of the article, the remaining amount, the delivery distance or delivery time, and the flying information; and switch the operation mode to the prohibition mode upon determining that the unmanned aerial vehicle is unable to navigate to the delivery destination and switch the operation mode to the delivery mode upon determining that the unmanned aerial vehicle is able to navigate to the delivery destination.

9. The takeoff and landing device according to claim 1, the first controller being further configured to:

acquire a remaining amount of an energy source for a power source installed on the unmanned aerial vehicle;

acquire a delivery distance or delivery time from a current location to a delivery destination of the article;

determine the flying distance or flying time of the unmanned aerial vehicle based on the remaining amount when the article is not loaded on the unmanned aerial vehicle;

store flying information that is a relationship between the weight of the article and the change in the flying distance or flying time of the unmanned aerial vehicle from loading the article on the unmanned aerial vehicle;

determine the change in the flying distance or flying time of the unmanned aerial vehicle when the article is loaded on the unmanned aerial vehicle based on the acquired weight of the article;

determine a corrected flying distance or flying time of the unmanned aerial vehicle based on the determined flying distance or flying time of the unmanned aerial vehicle when the article is not loaded on the unmanned aerial vehicle and based on the determined change in the flying distance or flying time of the unmanned aerial vehicle when the article is loaded on the unmanned aerial vehicle;

determine whether the unmanned aerial vehicle is able to navigate to the delivery destination based on the corrected flying distance or flying time and the acquired delivery distance or delivery time; and switch to the first state upon determining that the unmanned aerial vehicle is unable to navigate to the delivery destination and switch to the second state upon determining that the unmanned aerial vehicle is able to navigate to the delivery destination.

10. The unmanned delivery system according to claim 6, the controller being further configured to:

acquire a remaining amount of an energy source for a power source installed on the unmanned aerial vehicle;

acquire a delivery distance or delivery time from a current location to a delivery destination of the article;

determine the flying distance or flying time of the unmanned aerial vehicle based on the remaining amount when the article is not loaded on the unmanned aerial vehicle;

store flying information that is a relationship between the weight of the article and the change in the flying distance or flying time of the unmanned aerial vehicle from loading the article on the unmanned aerial vehicle;

determine the change in the flying distance or flying time of the unmanned aerial vehicle when the article is loaded on the unmanned aerial vehicle based on the acquired weight of the article;

determine a corrected flying distance or flying time of the unmanned aerial vehicle based on the determined flying distance or flying time of the unmanned aerial vehicle when the article is not loaded on the unmanned aerial vehicle and based on the determined change in the flying distance or flying time of the unmanned aerial vehicle when the article is loaded on the unmanned aerial vehicle;

determine whether the unmanned aerial vehicle is able to navigate to the delivery destination based on the corrected flying distance or flying time and the acquired delivery distance or delivery time; and switch the operation mode to the prohibition mode upon determining that the unmanned aerial vehicle is unable to navigate to the delivery destination and switch the operation mode to the delivery mode upon determining that the unmanned aerial vehicle is able to navigate to the delivery destination.

11. A takeoff and landing system comprising:

a takeoff and landing device for an unmanned aerial vehicle configured to deliver an article, the takeoff and landing device allowing the unmanned aerial vehicle to perform taking off and landing, and comprising a first controller including a processor and a memory, the first controller being configured to:

switch between a first state that is a state of preventing the unmanned aerial vehicle from taking off from the takeoff and landing device and a second state that is a state of not preventing takeoff;

acquire a weight of the article that the unmanned aerial vehicle delivers;

determine a change in a flying distance or flying time of the unmanned aerial vehicle caused by the article being loaded on the unmanned aerial vehicle and based on the acquired weight of the article; and switch to the first state or the second state based on the weight of the article acquired, a reference value for determining whether the weight of the article is an overload, and the change in the flying distance or flying time.

12. The takeoff and landing system according to claim 11, further comprising:

an unmanned aerial vehicle including a second weight detector configured to measure a weight of an article to deliver, and being configured to deliver the article by flying based on a control signal that controls flight of the unmanned aerial vehicle, wherein the first controller is configured to acquire the weight of the article from the second weight detector.

13. The takeoff and landing system according to claim 12, wherein the unmanned aerial vehicle comprises:

a communication unit configured to receive the control signal that controls the flight of the unmanned aerial vehicle; and a second controller configured to determine, based on the weight detected by the second weight detector and a predetermined reference value, whether the unmanned aerial vehicle is in an overloaded state when the article to deliver is loaded, and the second controller prohibits operating of the unmanned aerial vehicle based on the control signal received in the communication unit upon determining that the unmanned aerial vehicle is in the overloaded state.

14. The takeoff and landing system according to claim 11, further comprising:

a second controller configured to make notification of a target product to pick from a product group accommodated in a product shelf, receive presence of picking of the target product, and estimate a total weight of the target product, wherein the first controller acquires the estimated total weight of the target product from the second controller.

15. The takeoff and landing system according to claim 11, further comprising:

a server including a second controller configured to receive an order for a product via a network, store product information in which the product and a weight of the product are associated with each other, and estimate a total weight of the product based on the product information and of the product for which the order is received by the second controller, wherein the first controller acquires the estimated total weight of the product from the second controller.

* * * * *